United States Patent
Kuhlbach et al.

(10) Patent No.: US 10,316,741 B2
(45) Date of Patent: Jun. 11, 2019

(54) TURBOCHARGED COMBUSTION SYSTEM

(75) Inventors: Kai Sebastian Kuhlbach, Bergisch Gladbach (DE); Dirk Borrmann, Huerth (DE); Rainer Friedfeldt, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/904,222

(22) Filed: Oct. 14, 2010

(65) Prior Publication Data

US 2012/0090320 A1    Apr. 19, 2012

(51) Int. Cl.
| | |
|---|---|
| *F02F 1/24* | (2006.01) |
| *F01N 13/10* | (2010.01) |
| *F02B 37/00* | (2006.01) |
| *F02B 37/18* | (2006.01) |
| *F02B 67/10* | (2006.01) |

(52) U.S. Cl.
CPC .............. *F02B 37/18* (2013.01); *F01N 13/10* (2013.01); *F02B 37/001* (2013.01); *F02B 37/004* (2013.01); *F02B 67/10* (2013.01); *F02F 1/243* (2013.01); *Y02T 10/144* (2013.01)

(58) Field of Classification Search
CPC ...... F01N 13/10; F02B 37/001; F02B 37/004; F02B 67/10; F02B 37/18; F02F 1/243; Y02T 10/144
USPC ............................ 60/598, 599, 600, 602, 612
See application file for complete search history.

(56) References Cited

U.S. PATENT DOCUMENTS

| | | | | |
|---|---|---|---|---|
| 3,948,052 | A | * | 4/1976 | Merkle et al. ............... 60/605.1 |
| 4,930,315 | A | * | 6/1990 | Kanesaka ....................... 60/600 |
| 5,408,979 | A | * | 4/1995 | Backlund et al. ............ 123/562 |
| 7,302,800 | B2 | * | 12/2007 | Klingel ................... F02B 37/18 |
| | | | | 60/612 |

(Continued)

FOREIGN PATENT DOCUMENTS

| | | | |
|---|---|---|---|
| DE | 19822874 A1 * | 11/1999 | ............ F02B 37/004 |
| DE | 102007046657 A1 | 4/2009 | |

(Continued)

OTHER PUBLICATIONS

Machine Translation of French Patent Publication FR2914367 A1 (published Oct. 2008), Doleac Laurent.*

(Continued)

*Primary Examiner* — Mary Davis
(74) *Attorney, Agent, or Firm* — Julia Voutyras; Brooks Kushman P.C.

(57) ABSTRACT

An engine combustion system is disclosed which includes: a cylinder head having at least two cylinders; an exhaust duct adjoining each cylinder with the exhaust ducts of at least two cylinders converging to form an exhaust manifold within the cylinder head and two turbines arranged downstream of the exhaust manifold. In one embodiment, the two turbines are arranged in parallel with a control element disposed upstream of one of the turbines to close off flow to the one turbine. Alternatively, a first of the turbines has a first bypass duct having a first valve. Flow exiting the turbine and the bypass path converge and are provided to a second of the turbines that has a second bypass duct having a second valve. By controlling positions of each valve, flow can be provided solely to the associated turbine, the associated bypass duct, or a combination.

8 Claims, 1 Drawing Sheet

(56) References Cited

U.S. PATENT DOCUMENTS

| | | | |
|---|---|---|---|
| 7,448,368 B2 | 11/2008 | Freese | |
| 7,584,748 B2 | 9/2009 | Freese | |
| 8,276,378 B2 * | 10/2012 | Song | F01D 17/16 60/600 |
| 8,312,721 B2 * | 11/2012 | Smatloch | F02B 37/004 415/102 |
| 8,863,514 B2 * | 10/2014 | Joergl | F02B 37/18 60/612 |
| 9,038,384 B2 * | 5/2015 | Tomita | F02B 37/18 60/612 |
| 9,057,319 B2 * | 6/2015 | Joergl | F02B 37/18 |
| 2007/0062188 A1 * | 3/2007 | Fry et al. | 60/599 |
| 2008/0178591 A1 * | 7/2008 | Axelsson et al. | 60/602 |
| 2009/0132153 A1 | 5/2009 | Shutty et al. | |
| 2009/0241526 A1 * | 10/2009 | Son et al. | 60/321 |
| 2009/0287397 A1 | 11/2009 | Massard et al. | |
| 2010/0095671 A1 * | 4/2010 | Takagawa et al. | 60/602 |
| 2010/0175374 A1 * | 7/2010 | Steiner et al. | 60/598 |
| 2010/0187460 A1 * | 7/2010 | An et al. | 251/301 |
| 2011/0041498 A1 * | 2/2011 | Kuhlbach | 60/613 |
| 2011/0132296 A1 * | 6/2011 | Kuhlbach | 123/41.82 R |
| 2011/0296830 A1 * | 12/2011 | Tsukamoto | F02B 37/004 60/602 |
| 2012/0037101 A1 * | 2/2012 | Riegger et al. | 123/41.82 R |

FOREIGN PATENT DOCUMENTS

| | | | |
|---|---|---|---|
| FR | 2914367 | A1 | 10/2008 |
| GB | 1220296 | A | 1/1971 |
| JP | 61210223 | A * | 9/1986 |
| JP | 62064828 | U | 4/1987 |
| JP | 02201026 | A | 8/1990 |
| JP | 2005156960 | A | 6/1993 |
| JP | 2002303145 | A | 10/2002 |
| JP | 2006063851 | A | 3/2006 |
| JP | 2006194227 | A | 7/2006 |
| JP | 2008267257 | A | 11/2008 |
| WO | 2006123093 | A1 | 11/2006 |
| WO | 2007105108 | A2 | 9/2007 |
| WO | 2008118660 | A1 | 10/2008 |
| WO | 2009148917 | A2 | 12/2009 |

OTHER PUBLICATIONS

Search Report dated Jan. 22, 2010, for EP09174660.
English Translation of Office Action dated Sep. 3, 2013, for corresponding Chinese Application 201010135597.2.

* cited by examiner

TURBOCHARGED COMBUSTION SYSTEM

BACKGROUND

1. Technical Field

The disclosure relates to an engine combustion system having two turbines in the engine exhaust.

2. Background Art

Internal combustion engines have a cylinder block and a cylinder head to form the individual cylinders, that is to say, combustion chambers. Pistons reciprocate within cylinder liners in the cylinder block.

The cylinder head contains actuatable valves for controlling flow into and out of the combustion chambers with the valve drivetrain conventionally located in the cylinder head.

Intake ducts leading to intake valves and exhaust ducts leading away from exhaust valves are at least partially integrated into the cylinder head. For example, exhaust ducts of at least two cylinders may converge into an overall exhaust duct within the cylinder head. The convergence of the many exhaust ducts into an overall duct may be called an exhaust manifold.

Downstream of the exhaust manifold, a turbine of a turbocharger may be situated. Furthermore, an exhaust gas aftertreatment system may be included in the engine exhaust as well.

It is desirable to arrange the turbine of the turbocharger as close to the exhaust valves as possible to optimally utilize the exhaust-gas enthalpy, i.e., prior to cool down. Such an arrangement aids in providing a fast response behavior of the turbocharger and to provide a short path to exhaust gas aftertreatment devices to facilitate quick light-off of the aftertreatment device following a cold start of the engine.

Thermal inertia of the part of the exhaust ducts situated between the exhaust valve and the exhaust aftertreatment system, or between the exhaust valve and the turbine, should therefore also be as low as possible, which can be obtained by reducing the mass and the length of the corresponding parts.

To facilitate low thermal inertia, it is expedient for the exhaust ducts to converge within the cylinder head so as to form an integrated exhaust manifold. The length of the exhaust ducts is reduced as a result of the integration. This improves the response behavior of the turbine and the enthalpy of the exhaust gases at the inlet into the turbine is increased.

Turbocharged internal combustion engines are however often equipped with a plurality of exhaust-gas turbochargers to improve the torque characteristics of the internal combustion engine over a wide operating range. While a single turbine may be close-coupled, that is to say positioned close to the cylinder head, as a result of the integration of the manifold, a dual-turbocharger arrangement that is close-coupled is desired.

SUMMARY

An engine combustion system having: a cylinder head having at least two cylinders, an exhaust duct adjoining each cylinder with the exhaust ducts of at least two cylinders converging to form an exhaust manifold within the cylinder head, and two turbines arranged in parallel, located downstream of the exhaust manifold. The two turbines have a common turbine housing with a control element for directing exhaust gas flow between the two turbines. The turbine housing is a separate component from the exhaust manifold. Alternatively, at least a portion of the turbine housing is integrated into the exhaust manifold. The turbine housing is equipped with a coolant jacket coupled to a coolant jacket in the cylinder head. The control element has two positions: fully closed and fully open. Alternatively, the control element is continuously variable. The control element closes off flow to one turbine when exhaust flow is below a predetermined level and allows flow to the one turbine when exhaust flow is greater than the predetermined level. In one embodiment, the control element closes off flow to one turbine when exhaust flow is below a predetermined level; the control element is at least partially open, thereby allowing flow the one turbine, when the exhaust flow is above the predetermined level; and the position of the control element is based on the level of the exhaust flow. The control element is one of a poppet valve and a butterfly valve.

Also disclosed is an engine combustion system having: a cylinder head having at least two cylinders, an exhaust duct adjoining each cylinder with the exhaust ducts of at least two cylinders converging to form an exhaust manifold within the cylinder head, a first turbine disposed downstream of the exhaust manifold and arranged in a housing, a first bypass duct arranged in parallel with the first turbine and disposed in the housing wherein an outlet from the first turbine converges with an outlet from the first bypass duct in a combined duct, a first control element disposed in the first bypass duct controlling a proportion of exhaust flow allowed to bypass the first turbine, a second turbine arranged in the housing downstream of the combined duct, a second bypass duct arranged in parallel with the second turbine and disposed in the housing and a second control element disposed in the second bypass duct controlling a proportion of exhaust flow allowed to bypass the second turbine. The first control element is one of a poppet valve, a butterfly valve, and a flapper valve and the second control element is one of a poppet valve, a butterfly valve, and a flapper valve. The housing is integral with the exhaust manifold or a separate element coupled to the exhaust manifold. A water jacket in the housing is coupled to a water jacket in the cylinder head. The engine system further includes an electronic control unit electronically coupled to the engine, engine sensors, and the first control element. The electronic control unit commands the first control element to open when exhaust flow is below a predetermined level.

A method to control an engine combustion system is also disclosed in which the engine system includes: a first turbine is disposed in an engine exhaust with a first control element disposed in a first bypass duct arranged in parallel with the first turbine, a cylinder head having at least two cylinders; an exhaust duct adjoining each cylinder with the exhaust ducts of at least two cylinders converging to form an exhaust manifold within the cylinder head, a first turbine arranged in a housing coupled to the cylinder head, a first bypass duct arranged in parallel with the first turbine and disposed in the housing wherein an outlet from the first turbine converges with an outlet from the first bypass duct in a combined duct, a first control element disposed in the first bypass duct controlling a proportion of exhaust flow allowed to bypass the first turbine, a second turbine arranged in the housing downstream of the combined duct, a second bypass duct arranged in parallel with the second turbine and disposed in the housing and a second control element disposed in the second bypass duct controlling a proportion of exhaust flow allowed to bypass the second turbine. The method includes commanding the first control element to be one of fully open and fully closed when exhaust flow is less than a predetermined level. The method may also include commanding the first control element to a partially open position and the second control element to a closed position when a partially parallel flow arrangement through the first and second turbines is desired and commanding the first control and second control elements closed when a substantially serial flow arrangement through the first and second turbines is desired. In one embodiment, the first control element is commanded to a closed position at a lower exhaust gas flow rate.

An advantage according to the disclosure is that by providing a cylinder head with an integrated manifold and coupling the turbines either within the cylinder head or in a housing coupled directly to the cylinder head, thermal losses ahead of the turbocharger are minimized. Furthermore, the total package size can be minimized. Coolant is efficiently provided to the turbochargers from the water jacket of the cylinder head.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
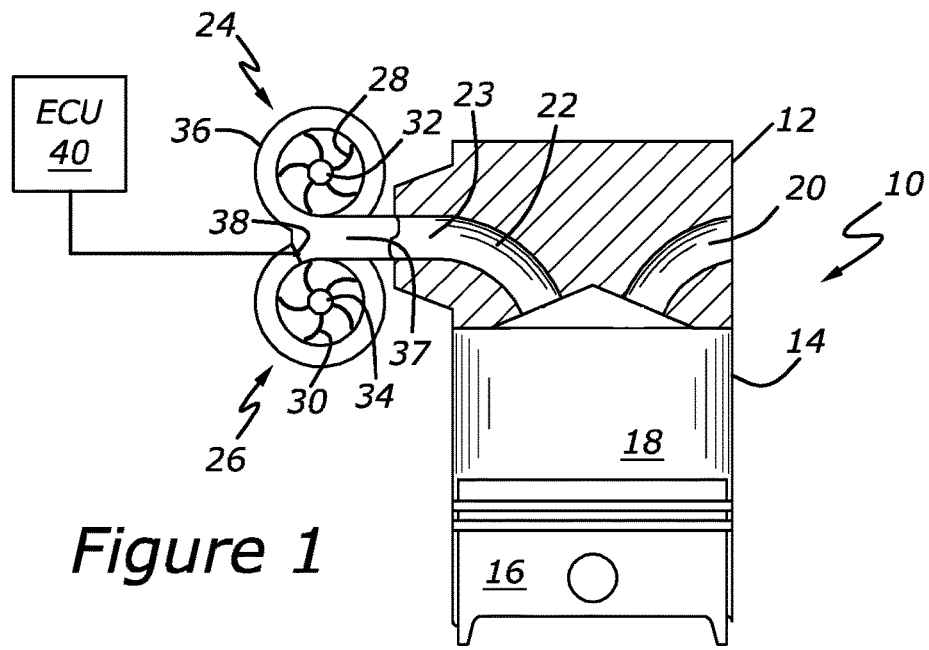
FIGS. 1 and 2 show schematics of combustion systems according to embodiments of the disclosure.

An engine combustion system 10 is shown in FIG. 1 in which a single cylinder of an internal combustion engine includes a cylinder head 12 and a cylinder block 14. Within cylinder block 14, a piston 16 reciprocates. The volume above the piston which is contained within cylinder head 12 and a cylinder liner of cylinder block 14 forms a combustion chamber 18. Fresh air is provided into combustion chamber 18 via an intake duct 20. A valve (not shown) is provided between duct 20 and combustion chamber 18 to permit flow between the two at predetermined times. Similarly, an exhaust duct 22 is coupled to combustion chamber 18 via a valve or valves (not shown). Only one cylinder is shown schematically in FIG. 1. However, typically multiple cylinders are included in engine block 14 with at least one exhaust duct 22 provided for each cylinder. In some embodiments, the multiple exhaust ducts converge into a single duct before exiting cylinder head 12, with such a configuration known as an integrated exhaust manifold. The converged duct is shown in FIG. 1 as element 23.

At the outlet of exhaust duct 22, a pair of turbines 24, 26 is provided. Turbines 24, 26 may be coupled to compressors (not shown). Turbochargers typically include a turbine disposed in the exhaust which is shaft-coupled to a compressor disposed in the intake. Rotors 28, 30 are affixed to shafts 32, 34. Turbines 24, 26 are disposed in a housing 36. Housing 36 is partially integrated in cylinder head 12 such that cylinder head 12 and a part of housing 36 form a monolithic component.

Turbines 24, 26 are arranged in parallel with an inlet duct 37 for branching the flow. A control element 38 is coupled upstream of turbine 26 to control the exhaust gas flow distribution between the two turbines. The position of control element 38 is controlled by an electronic control unit (ECU) 40. As shown in FIG. 1, control element 38 is in a position in which flow to turbine 26 is substantially cut off with all of the flow directed to turbine 24.

Cylinder head 12 has a coolant jacket (not shown) integrated with a coolant jacket in housing 36 for the turbines.

Figure 2:
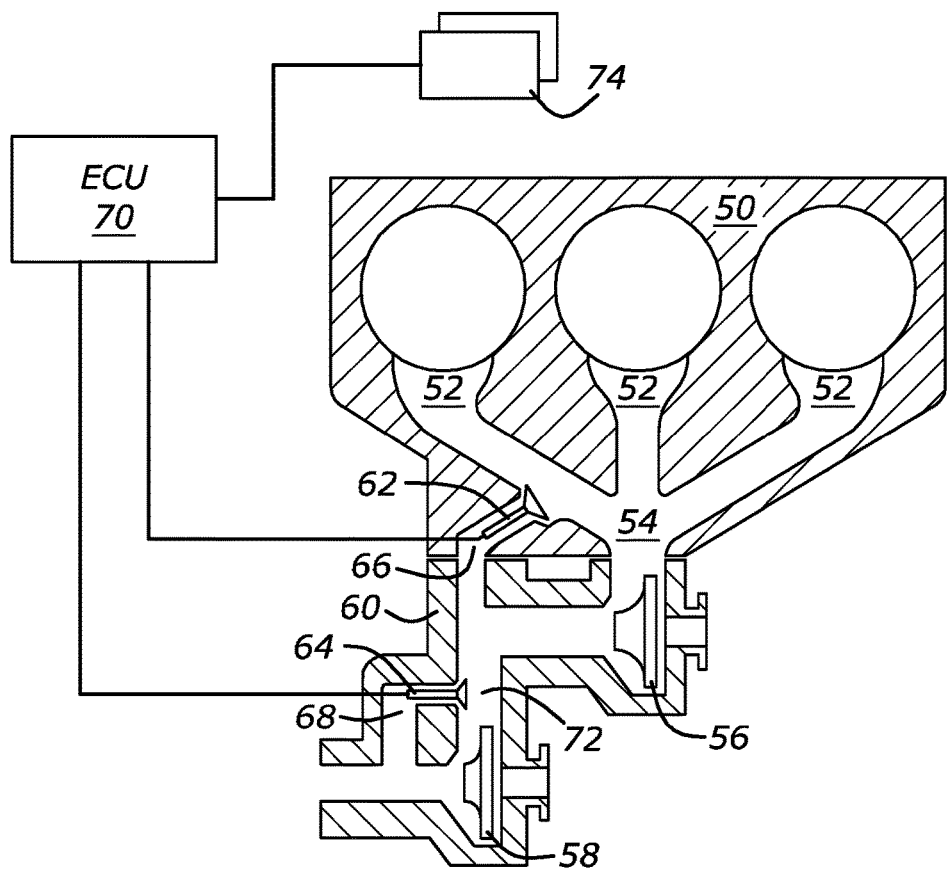

An alternative arrangement is shown in FIG. 2. A cylinder head 50 has, in this example, 3 cylinders. Exhaust ducts 52 converge to form a single exhaust duct 54 within cylinder head 50, a so-called integrated exhaust manifold. A pair of turbines 56, 58 is disposed within a housing 60. In the embodiment shown in FIG. 2, housing 60 is a separate component from cylinder head 50. Alternatively, housing 60 may be integrated into a monolithic component with cylinder head 50. ECU 70 is electronically controlled to a driver (not shown) which actuates poppet valves 62 and 64. A first bypass duct 66 is provided in parallel with first turbine 56. Poppet valve 62 is provided at the entrance to bypass duct 66, or alternatively, at any location within bypass duct 66. By controlling the lift of poppet valve 62 from a seat (not shown) at the entrance to bypass duct 66, the amount of flow passing through turbine 56 is controlled. Similarly, flow through the second turbine 58 is controlled by controlling the lift of poppet valve 64. With such an arrangement, the two turbines can be operated in a serial mode, i.e., when poppet valve 62 is completely closed so that flow through first turbine 56 is provided to second turbine 58. All of the flow is provided to second turbine 58 when poppet valve 64 is closed. Alternatively, a portion of the flow bypasses second turbine 58 when poppet valve 64 is at least partially open. The flow through the two turbines 56, 58 can be partially parallel flow when first poppet valve 62 is at least partially open so that some of the flow bypasses poppet valve 64. The flow exiting turbine 56 and bypass duct 66 converges in duct 72 prior to being supplied to turbine 58 and/or bypass duct 68. Because the flow converges, it is not a completely parallel arrangement because some of the flow that passes through turbine 56 can pass through turbine 58 due to the convergence of the exit flows from the first turbine and the first bypass duct. Nevertheless, flow through the two turbines 56, 58 can be controlled via poppet valves 62, 64 in such a way to provide a partially parallel flow arrangement. Further alternatives include: the flow passing through only first turbine 56 when first poppet valve 62 is closed and second poppet valve 64 is open; and the flow passing through only second turbine 58 when first poppet valve 62 is open and second poppet valve 64 is closed. If turbines 56, 58 are sized differently, good turbine performance can be obtained throughout the flow range by adjustments in the positions of valves 62, 64. ECU 70 determines the desired position of valves 62, 64 based on signals from sensors 74, such as an air flow sensor, temperature sensors, pressure sensors, an engine speed sensor, etc.

In FIG. 1 a butterfly type valve is shown as control element 38 and in FIG. 2 poppet valves are shown as control elements 62, 64. However, either type of valve, or any other suitable type may be used in any of the locations.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation.

These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. An engine combustion system having a cylinder head with at least two cylinders and an exhaust duct adjoining each cylinder with the exhaust ducts of at least two cylinders converging to form an exhaust manifold within the cylinder head, the combustion system comprising:
    a first turbine disposed downstream of the exhaust manifold and arranged in a housing;
    a first bypass duct positioned upstream of where the at least two cylinders converge to form the exhaust manifold within the cylinder head and arranged in parallel flow relationship with the first turbine and extending from the cylinder head into the housing wherein an outlet from the first turbine converges with an outlet from the first bypass duct in a combined duct;
    a first control element disposed in the first bypass duct controlling a proportion of exhaust flow allowed to bypass the first turbine, wherein the first control element is configured to open responsive to exhaust flow being below a predetermined level; and
    a second turbine arranged in the housing downstream of the combined duct.

2. The system of claim 1, further comprising:
    a second bypass duct arranged in parallel flow relationship with the second turbine and disposed in the housing; and
    a second control element disposed in the second bypass duct controlling a proportion of exhaust flow allowed to bypass the second turbine.

3. The system of claim 2 wherein the first control element is one of a poppet valve and a butterfly valve, and the second control element is one of a poppet valve and a butterfly valve.

4. The system of claim 1 wherein the housing is a separate element coupled to the exhaust manifold.

5. The system of claim 1, further comprising:
    an electronic control unit electronically coupled to the engine, engine sensors, and the first control element wherein the electronic control unit commands the first control element to open when exhaust flow is below a predetermined level.

6. A method to control an engine combustion system, comprising:
    commanding, by a controller, a first valve to be fully open when exhaust flow is less than a predetermined level wherein the engine combustion system includes:
        a cylinder head having at least two cylinders;
        an exhaust duct adjoining each cylinder with the exhaust ducts of the at least two cylinders converging to form an exhaust manifold within the cylinder head;
        a first turbine arranged in a housing coupled to the cylinder head;
        a first bypass duct arranged in parallel flow relationship with the first turbine and having an inlet upstream of where the exhaust ducts of the at least two cylinders converge to form the exhaust manifold within the cylinder head and an outlet disposed in the housing wherein an outlet from the first turbine converges with the outlet from the first bypass duct in a combined duct, wherein the first control element is disposed in the first bypass duct for controlling a proportion of exhaust flow allowed to bypass the first turbine; and
        a second turbine arranged in the housing downstream of the combined duct.

7. The method of claim 6 wherein the combustion system further includes a second bypass duct arranged in parallel flow relationship with the second turbine and disposed in the housing and a second valve disposed in the second bypass duct controlling a proportion of exhaust flow allowed to bypass the second turbine, the method further comprising:
    commanding, by the controller, the second valve to a closed position at an exhaust flow level lower than the predetermined level.

8. An engine combustion system, comprising:
    a cylinder head having an integrated exhaust manifold where exhaust ducts of at least two cylinders converge; and
    a housing having:
        a first turbine downstream of the integrated exhaust manifold;
        a bypass duct disposed upstream of where the exhaust ducts of the at least two cylinders converge and in parallel flow relationship with the first turbine;
        a combined duct combining flow from the first turbine and the bypass duct;
        a valve in the bypass duct that opens responsive to exhaust flow being below a predetermined level; and
        a second turbine downstream of the combined duct.

* * * * *